Figure 1:
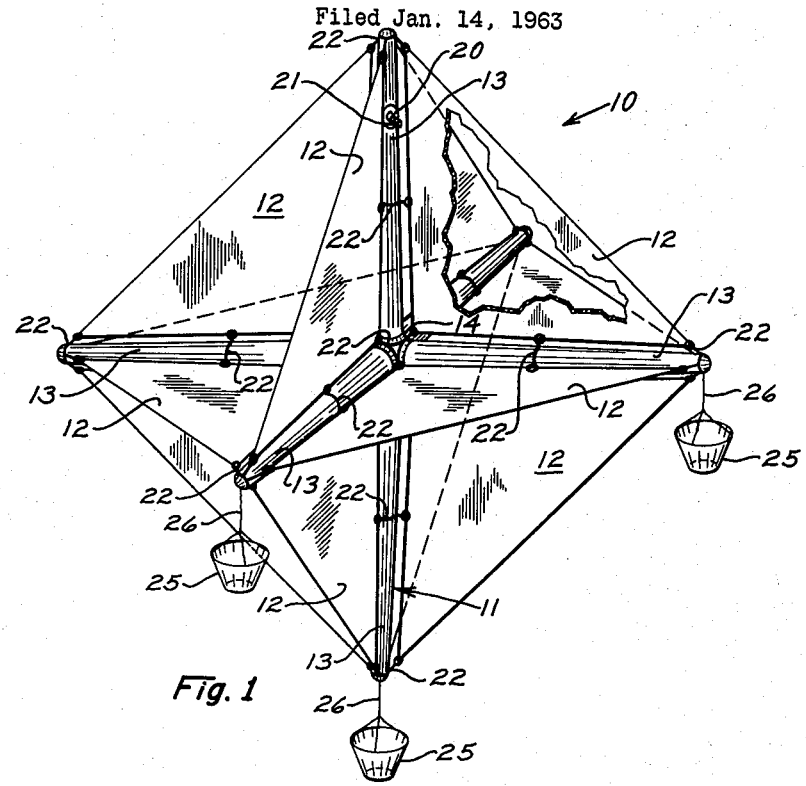

Dec. 14, 1965    M. I. RADNOFSKY ETAL    3,224,001
INFLATABLE RADAR REFLECTOR UNIT
Filed Jan. 14, 1963

INVENTORS
Matthew I. Radnofsky
Glenn A. Shewmake
BY
ATTORNEYS

United States Patent Office 3,224,001
Patented Dec. 14, 1965

3,224,001
INFLATABLE RADAR REFLECTOR UNIT
Matthew I. Radnofsky and Glenn A. Shewmake, Houston, Tex., assignors to the United States of America as represented by the Administrator of the National Aeronautics and Space Administration
Filed Jan. 14, 1963, Ser. No. 251,449
6 Claims. (Cl. 343—18)
(Granted under Title 35, U.S. Code (1952), sec. 266)

The invention described herein may be manufactured and used by the Government of the United States of America for governmental purposes without the payment of any royalties thereon or therefor.

This invention relates generally to a reflector of electromagnetic radiation, and more particularly to a buoyant reflector unit which by its reflectivity is adapted to permit radar indication of its location on the surface of the sea from great distances.

The capabilities and limitations of radar for use in locating objects on the surface of the sea, such as a life raft or downed aircraft, are widely recognized. Since the object to be located is frequently a poor reflector of radio microwaves, its radar reflection return is usually indistinguishable from the reflection return of the surrounding sea and therefore limits the effectiveness of radar search. To more conspicuously indicate and mark the location of an object afloat at sea, reflector buoys have been devised which are highly reflective to electromagnetic radiation of the radio microwave frequencies and are adaptable for erection and deployment at the site of the downed aircraft or other object to be located.

For use as survival equipment to be carried aboard aircraft or spacecraft, it is particularly important and desirable that such reflector units be of very light weight and reducible to a very small size for such compact packaging of the reflector unit as would require a minimum of storage space. To function usefully and effectively at sea, a buoyant reflector unit should possess rigidity to a degree sufficient to preserve its structural integrity and should present as little resistance to the wind as possible in order to maintain its functional configuration and orientation. The unit also should be self-buoyant and seaworthy so as to obviate the need of any complementary supporting structures. A simple form of construction is also desirable so that only a minimum expense of time and effort is needed to erect and deploy the reflector. In addition, it should exhibit a characteristically high degree of reflectivity to a radar beam or other electromagnetic radiation, irrespective of the direction of the incident rays.

Most of the radar reflector units which have hitherto been devised are of the corner reflector type comprising three mutually perpendicular and intersecting reflective planes which enable the reflector to provide a radar return irrespective of the orientation of the reflector with respect to the source. These buoyant reflectors are generally provided with external supporting frames, such as inflatable toroidal beams or balloons, in which the reflective elements of the reflector are suspended. The external frameworks of these reflectors require such a large volume of inflating medium as to make oral inflation of these frameworks either prohibitive or, at best, unduly laborious and time consuming. Furthermore, their inflatable members necessarily possess bulk of a quantity which inhibits the reduction of these units to a small and packageable size as is particularly desired for reflector units which are to be included as survival equipment to be carried aboard spacecraft. It is also characteristic of such reflectors that because they are external the supports are generally of longer dimensions or of greater size than the reflector elements, and bend or yield more easily with the result that the reflective vanes are not supported with the rigidity sufficient to maintain the reflective planes of the reflector in a substantially mutually perpendicular relationship. In such instances of non-perpendicularity, the radar return from one part of a corner of the reflector will be out of phase with the return from another part so as to destructively interfere with, and therefore reduce, the signal return of the reflector.

Other types of buoyant reflectors have been devised which employ rigid members of metal, or the like, for supporting the reflective elements of the reflector. Although these units may be of the collapsible type, they are, however, of greater weight and bulk than the reflector units with non-rigid, inflatable support members and also do not permit a wide latitude in the manner of packaging and stowage. In addition, the rigid parts increase the danger of puncture to inflatable buoyant members of the unit and other inflatable objects, such as a life raft to which the reflector may be moored.

To overcome these attendant disadvantages in the radar reflector units of the prior art, the reflector unit of this invention is one of the corner reflector type which is constructed with a non-rigid internal supporting framework having inflatable beams which extend radially in mutually perpendicular directions from the geometric center of the unit and along the intersections of the three mutually perpendicular planes in which the reflective surfaces of the unit are disposed. The reflective vanes are attached to the inflatable beams of the framework which, upon being inflated, serves to erect and support the reflective elements in the characteristic geometry of a corner reflector. The diameter of the inflatable beams adjacent the geometric center of the unit is substantially larger than that of their extremities to thereby increase rigidity and stability by presenting a smaller area of wind resistance in the upper part of the floating reflector where the wind is generally greatest. In addition to providing a sturdy support for the reflective vanes, the internally disposed framework requires less bulk than the external type frameworks so that when the framework is deflated the reflector unit is collapsed and reducible to a smaller lightweight package. Since the framework of this reflector also requires a considerably smaller volume of inflating medium than the reflector units with external supporting frameworks, the reflector is simpler to erect and deploy.

An object of this invention is to provide a new and improved buoyant reflector unit which is highly reflective to electromagnetic radiation particularly within the band of frequencies commonly used in radar.

Another object is to provide a self-floating reflector unit of lightweight, simple construction which is specially adapted to reflect radio microwaves to the source from which they emanate, irrespective of the orientation of the source with respect to the reflector, and which is collapsible and reducible to a very small size for compact packaging.

Still another object is to provide a collapsible radar reflector buoy in which buoyancy is provided by means of an inflating medium and which, upon being inflated, serves to erect and support the reflective members of the buoy.

A further object is to provide a buoyant, collapsible radar reflector unit without rigid parts which may be erected and deployed for functional operation with only a minimum expense of time and effort.

A still further object is to provide a new and improved self-floating radar reflector unit constructed without rigid parts which offers a minimum resistance to the wind and is adapted to maintain its functional configuration and stability under turbulent conditions and heavy seas.

A still further object is to provide a radar corner reflector with reflective members arranged in three mutually perpendicular and intersecting planes wherein the reflective members are attached to a unitary inflatable structure which supports the reflective members along the lines of intersection of said planes to thereby provide a sturdy support for the reflective members and which, in heavy seas, will maintain the reflective members in substantially perpendicular planes.

Figure 2:
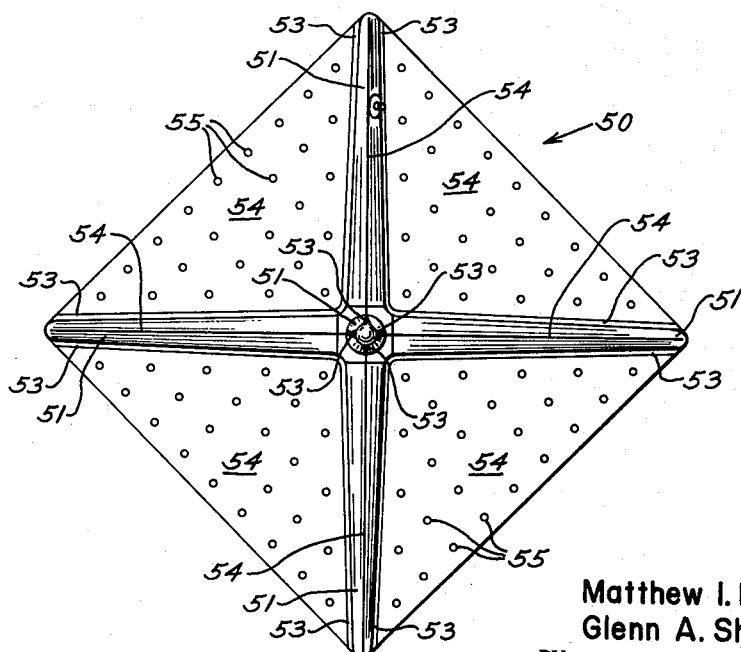

Other objects and many of the attendant advantages of this invention will be readily appreciated as the same become better understood by reference to the following detailed description when considered in connection with the accompanying drawings in which like reference numerals designate like parts throughout the figures thereof and wherein:

FIGURE 1 is a perspective view of a radar reflector unit which represents one embodiment of the invention; and FIGURE 2 is a view normal to one of the reflective planes of a modified form of the invention.

Referring more particularly to the drawings, there is shown in FIGURE 1 a radar reflector unit 10, which represents one embodiment of the invention. The reflector 10 is of the corner reflector type and comprises an inflatable framework 11 from which are supported a plurality of radar reflective vanes 12 disposed in three mutually perpendicular and intersecting planes as is characteristic of a corner reflector. The inflatable framework is comprised of six inflatable beams or arms 13 which when inflated extend radially from a central hub 14 disposed at the geometric center of the unit. As constructed, the inflatable beams of the framework are disposed to lie with their longitudinal axes coincident with the intersections of the perpendicular planes in which the reflective vanes are disposed so that a pair of the inflatable beams is disposed along each line of intersection of the reflective planes.

The inflatable beams 13 and central hub 14 are fabricated of thin lightweight Mylar, a polyester film manufactured by E. I. du Pont de Nemours, Inc., which in addition to characteristics of toughness and durability, is flexible, water-repellent and highly chemically resistant. The hub is formed from pieces of thin sheet Mylar with arcuate edges defining circular openings at which the hub is joined to the beams which radiate from the hub and define therewith a unitary air-tight inflatable structure. The hub 14, of course, is not essential to the framework since the inflatable beams may be appropriately formed so as to be joined directly to one another in the manner of perpendicularly intersecting circular cylinders. The inflatable beams may be fabricated in any manner suitable for producing air-tight tubular structures.

Upon inflation of the framework, each reflective vane is disposed in such a manner that it lies co-planar with the axes of the beams to which it is attached. The reflective elements therefore define three mutually perpendicular reflective planes of the reflector and all together form an eight corner reflector which is thus able to produce a strong radar reflection return regardless of the direction of the incident illumination. In the reflector 10, a "corner" is formed by any three adjacent and mutually perpendicular reflective vanes which define a trihedral unit, the apex or "corner" of which is located at the geometric center of the reflector.

It is readily apparent that as the reflector unit is erected and deployed on the surface of the sea the outer end portions of at least three of the inflated beams will be disposed in the uppermost part of the reflector where the wind is greatest, irrespective of the rotative position of the reflector about its geometric center. Therefore, for the purpose of increasing the structural rigidity of the unit and minimizing the resistance of the reflector to the wind, the inflatable beams are formed with a gradual uniform taper such that the diameter of the beams adjacent the geometric center of the reflector is substantially larger, preferably twice that of their extremities. Hence, the smaller effective area of resistance to the wind which is provided by the narrow beam ends tends to increase the stability of the reflector and prevent collapsing of beams in wind or current.

To provide means for inflating the framework, an oral inflation tube 20, preferably of the type disclosed in U.S. Patent No. 2,502,301, is affixed to one of the beams of the inflatable unit in conventional manner. A one-way push type valve 21 installed in the free end of the tube is adapted to control the passage of air through the tube into the inflatable structure and permit the oral inflation thereof. In its normally closed position, the valve checks the exit of air from the inflatable structure.

The inflatable framework is, of course, designed with a volumetric displacement sufficient to provide buoyancy for the reflector, which may be of any arbitrary size sufficient to provide an effective radar return. One model of the reflector unit which has been constructed and has performed with gratifying results, is of a one-meter dimension from one end of a beam to the end of the beam which is coaxial therewith. In this particular model, the volumetric displacement of the framework is such that it may be orally inflated with approximately two breaths or lungsful of air, thus permitting rapid erection of the unit with only a minimal expense of time and effort.

The reflective members 12 of the unit are triangular in shape and in the form of a pliant aluminized webbing which is fabricated of very lightweight Mylar sheet material finely coated on both sides with aluminum by vaporization or other conventional methods. The aluminized webbing is desirably thin but is of a thickness sufficient to insure a radar reflectivity characteristic adequate for obtaining a detectable radar echo. It is to be understood, of course, that other materials such as silver-coated nylon and various flexible laminates which comprise electrically conductive materials may satisfactorily be used as the reflective elements.

The attachment of the reflective vanes to the inflatable beams is by means of small lengths of cord 22 which are tied to the beams at selected points. The cord may be taped to the reflective vanes and to the beams by narrow strips of a water-proof adhesive tape. The manner of attachment of the vanes, however, is such that their marginal edges extend along and parallel to the surfaces of the beams to which they are attached with each vane having one of its apices disposed adjacent the hub or geometric center of the unit. The vanes are spaced uniformly from the beams by a small distance to thus provide for a gap to permit the wind to flow through the reflector. This manner of attachment is particularly desirable in reducing wind resistance of the unit when the reflective vanes are in the form of imperforate sheets.

It is to be noted that when the reflector unit 10 is erected and deployed on the surface of the sea, the outer ends of the inflatable beams will provide a three-point support for the reflector irrespective of the rotative position of the reflector about its geometric center. However, to increase the seaworthiness of the buoyant unit and to further assist in preventing tumbling of the reflector, sea anchors 25 are desirably provided for three mutually adjacent beam extremities. The sea anchors are fabricated of Mylar and are in the conventional form of open end frusto-conical members suspended by means of cords 26 from the respective adjacent beam ends. Flexible and resilient loops of wire, such as piano wire, are circumferentially attached to the circular ends of the anchors to cause them to maintain their normally frusto-conical shape. Other types of lightweight flexible sea anchors, of course, might also be employed.

A modified form 50 of the radar reflector unit of this invention is disclosed in FIGURE 2 which illustrates a different mode of attaching the reflective elements to the inflatable beams and an alternate form of reflective vane. The reflector 50 is otherwise substantially identical to the reflector in FIGURE 1. The inflatable beams 51 of the inflatable frame of the reflector 50 are each provided with four longitudinal flanges 53 to which the reflective vanes 54 of the unit are attached by cementing. The flanges, which are preferably formed of folded Mylar strips, extend the length of the beam from hub to extremity and are cemented to the surface of the beam so as to lie within the perpendicular reflective planes of the reflector. The flanges thereby permit a continuous attachment of the reflective elements to the inflatable beams.

This manner of continuous attachment of the reflective vanes is a particularly satisfactory method where the vanes are of a type offering little resistance to the wind such as is demonstrated by the reflective vanes 54 which are thin sheets of radar reflective material provided with numerous perforations 55. The size of the perforations and closeness of their spacing is, of course, dependent on the frequency of electromagnetic radiation for which the reflector is designed to reflect and should be so selected as to not impair the reflectivity characteristic of the reflector. Other suitable alternatives for the form of the reflective vanes are wire mesh and elastic knitted material with metal coating, or the like, which will also provide ample radar reflection return and demonstrate little wind resistance. The manner of fabrication and attachment of the reflective vanes 54, of course, is not to be considered limiting or exclusive, but only illustrative, since other modes and means of attachment may obviously be employed.

It is readily apparent that the reflector unit of this invention may be made of various materials other than those disclosed herein provided they are of comparable weight, durability, and utility. For example, neoprene-coated nylon may be used as a substitute for Mylar in the fabrication of the inflatable frame. However, a radar reflector unit with a one-meter dimension from beam end to beam end and fabricated of the materials and in the manner described herein may be constructed which will weight only approximately six ounces and be reducible, when deflated, to a small compact package of no more than ten cubic inches in volume.

It will therefore be seen that a new and improved self-floating radar reflector unit of simple, lightweight construction is disclosed herein which exhibits unusual adaptability to maintaining its functional configuration and stability in rough seas and under turbulent conditions. It will further be seen that the radar corner reflector unit disclosed herein is comprised of an orally inflatable framework which, when inflated, provides firm support for the reflective elements along the lines of intersection of the reflective planes of the reflector and which requires only a small volume of inflating medium. It will further be seen that a collapsible radar reflector unit is disclosed herein which is fabricated without rigid parts, may be erected and deployed with only a minimum expense of time and effort, and is reducible to a vary small and lightweight package as is desirable for use as survival equipment to be carried aboard aircraft or spacecraft.

It should be understood, of course, that the foregoing disclosure relates only to preferred embodiments of the invention and that it is intended to cover all changes and modifications of the examples in the invention herein chosen for the purposes of the disclosure, which do not constitute departures from the spirit and scope of the invention.

What is claimed and desired to be secured by Letters Patent is:

1. A buoyant radar reflector unit comprising: a flexible corner reflector formed by a network of pliant triangular sheets having radar reflective surfaces and adapted to be disposed in three mutually perpendicular and intersecting planes in the characteristic geometry of a corner reflector; a plurality of inflatable beams which, upon inflation, extend radially from the geometric center of the reflector unit and lie longitudinally along the lines of intersection of said planes, said beams being substantially circular in cross-section and each said beam being tapered and having a diameter adjacent the geometric center of the unit which is substantially larger than its diameter adjacent its outer extremity; and means for attaching said reflective sheets to said inflatable beams whereby said reflective sheets are supported by said beams and said reflector is erected to its predetermined corner reflector form upon inflation of said beams, each said sheet being attached with one of its apices disposed adjacent the geometric center of the unit and a pair of its marginal edges attached along the length of a respective pair of said beams.

2. A buoyant radar reflector unit comprising: a flexible corner reflector formed by a network of pliant triangular sheets having radar reflective surfaces and adapted to be disposed in three mutually perpendicular and intersecting planes in the characteristic geometry of a corner reflector; a unitary inflatable structure of tubular inflatable beams which are substantially circular in cross-section and which when inflated extend radially from the geometric center of said reflector unit and are disposed to lie axially along the lines of intersection of said planes; and means for attaching said reflective sheets to said inflatable beams whereby said sheets are supported by said beams and said reflector is erected to its predetermined corner reflector form upon inflation of said beams, said beams being uniformly tapered and having a diameter adjacent said geometric center which is substantially twice the diameter adjacent their outer extremities.

3. A buoyant radar reflector unit comprising: a flexible corner reflector formed by a network of pliant triangular sheets having radar reflective surfaces and adapted to be disposed in three mutually perpendicular and intersecting planes in the characteristic geometry of a corner reflector; a unitary inflatable structure of tubular inflatable beams which are substantially circular in cross-section and which when inflated extend radially from the geometric center of said reflector unit and are disposed to lie axially along the lines of intersection of said planes; and means for attaching said reflective sheets to said inflatable beams whereby said sheets are supported by said beams and said reflector is erected to its predetermined corner reflector form upon inflation of said beams, said beams being tapered and each having a diameter adjacent the geometric center of the unit which is larger than the diameter adjacent its outer extremity to provide a smaller area of wind resistance towards the beam ends.

4. A radar reflector buoy comprising: a plurality of triangular radar reflective vanes; means for erecting and supporting said radar reflective vanes in three mutually perpendicular and intersecting planes in the characteristic geometry of a corner reflector, said means comprising a plurality of inflatable beams which when inflated extend radially from the geometric center of said reflector buoy and are disposed to lie longitudinally along the lines of intersection of said planes, each said beam presenting a decreasingly smaller area of wind resistance towards its beam end as compared to its area of wind resistance nearer the geometric center of the buoy, and each said vane being attached with one of its apices disposed adjacent the geometric center of the buoy and a pair of its marginal edges attached along the length of a respective pair of said beams.

5. In a radiant energy reflection system, a collapsible radar reflector buoy comprising: a plurality of pliant reflective vanes; inflatable support means for said reflective vanes adapted upon inflation to erect and support the reflective vanes in three mutually perpendicular and intersecting planes, said support means comprising a plurality of inflatable beams which upon inflation extend radially from the geometric center of the buoy and are disposed to lie longitudinally along the lines of intersection of said planes, each said beam having a tapering configuration with a transverse cross-section dimension adjacent the geometric center of the unit which is substantially larger than its transverse cross-section dimension adjacent its outer extremity.

6. A buoyant radar reflector unit comprising: a plurality of pliant triangular sheets having radar reflective surfaces adapted to be disposed in three mutually perpendicular and intersecting planes in the characteristic geometry of a corner reflector; a unitary inflatable structure of tubular inflatable beams which are substantially circular in cross-section and which when inflated extend radially from the geometric center of said reflector unit and are disposed to lie axially along the lines of intersection of said planes, each said beam presenting a decreasingly and substantially smaller area of wind resistance from adjacent said geometric center towards the beam end; and means for attaching said triangular sheets to said inflatable beams, each said sheet being attached with one of its apices disposed adjacent the geometric center of the buoy with a pair of its marginal edges disposed along the lengths of a respective pair of said beams and in spaced relation to the surfaces of said respective pair of beams to provide gaps in the structure of said reflector unit for reducing the wind resistance of the unit.

References Cited by the Examiner

UNITED STATES PATENTS 2,534,716  12/1950  Hudspeth et al. _____ 343—18

FOREIGN PATENTS 812,376  4/1959  Great Britain.

CHESTER L. JUSTUS, *Primary Examiner.*

LEWIS H. MYERS, *Examiner.*